United States Patent Office 2,969,590
Patented Jan. 31, 1961

2,969,590

PRODUCTION OF COMPOSITE ALUMINOUS METAL ARTICLES

Spencer R. Milliken, New Kensington, Pa., assignor to Aluminum Company of America, Pittsburgh, Pa., a corporation of Pennsylvania No Drawing. Filed Oct. 25, 1957, Ser. No. 692,286

14 Claims. (Cl. 29—488)

This invention relates to the production of wrought composite aluminous metal articles. More particularly, it relates to the manufacture of composite aluminous metal articles in which at least one component consists of an aluminum base alloy containing from 0.1 to 15 percent magnesium and wherein that component is pressure-bonded to another aluminous metal component.

The cladding of one aluminum base alloy member with another aluminous metal member is a well-known means of providing a product which has a greater resistance to corrosion or improved surface quality as compared to that of the bare alloy. Aluminum base alloys containing magnesium often possess high strength, especially when such elements as copper, zinc and silicon are present, and some exhibit a high resistance to corrosion. Both sypes are therefore useful as components of composite aluminous metal products.

For convenience, an aluminum base alloy containing 0.1 to 15 percent magnesium, alone or in combination with other elements, will be hereinafter referred to as an "aluminum-magnesium alloy."

In the manufacture of roll-bonded aluminous metal composite products, it is a common practice to assemble a core of substantial thickness with slabs of the cladding material positioned on opposite faces of the core, or on only one face, to preheat the assembly at a temperature between 700 and 1000° F. for 10 to 25 hours, and then to hot-roll it at 500 to 1000° F. with a substantial reduction in thickness of the components whereby a firm uniform bond is established between the cladding and core. As is well-known, the formation of such a bond is impaired by any heavy oxide film at the interface since the film reduces the effective area of bonding. To minimize such interference with bonding it is usually desirable to scalp or otherwise remove the original ingot or slab surface prior to the preheating step and this may be supplemented by scratch brushing, if necessary. Of course a thin oxide film immediately forms on the fresh metal surface. However, in the preheating operation, the oxide film increases in thickness, even at the interface between the assembled components, and may sometimes be removed by scratch-brushing. This film is especially pronounced on the surface of aluminum-magnesium alloy components that have been preheated and thus may prevent bonding over a large portion of the interfacial area with the result that the composite article must be rejected. Generally the absence of a bond is revealed by the development of blisters on the surface of the article after hot-rolling or when it is subsequently heat-treated.

It has been found that the heavy oxidation of aluminum-magnesium alloy articles is apparently related to the oxidation of magnesium at the external surface of the article and that the particles of these oxides or other oxy-compounds act as focal points or channels for further oxidation on and within the surface.

It has further been determined that above a certain critical temperature, there is a rapid increase in the rate of magnesium atom diffusion to the surface and concomitant oxidation of the magnesium. It has now been discovered that, for protection of aluminum-magnesium alloy articles, they must be subjected to a preliminary vapor treatment below that temperature, more particularly, at a point below the onset of any substantial amount of magnesium oxidation.

It is an object of this invention to provide a novel preliminary treatment for aluminum-magnesium alloy components that are to be bonded to each other or to other aluminous metal components to form a composite article.

It is also an object to provide a pretreatment for the aluminum-magnesium alloy components of a composite article whereby surface oxidation during preheating prior to bonding the components to each other is substantially eliminated.

It has been discovered that the foregoing objects and others can be attained through a preliminary treatment of the surface of the aluminum-magnesium alloy components by exposing them to boron trifluoride vapor in either pure or diluted form at a temperature between 400° F. and 750° F., but in all cases below the critical oxidation temperature of the alloy. The pretreated components and the other aluminous metal components, if any, are then heated to the hot-working temperature which is above the critical oxidation temperature of the aluminum-magnesium alloy, and pressure-bonded together. For the step of exposure to boron trifluoride vapors, it is generally preferred to utilize a temperature within the range of 400 to 775° F., 575° F. being the lowest critical oxidation temperature observed for aluminum-magnesium alloy articles.

The critical oxidation temperature of an aluminum-magnesium alloy article is defined as the lowest temperature at which the formation of magnesium oxide can be detected by electron diffraction techniques. This may be a particular temperature or a very narrow temperature range on the order of 20° F., and hence the term is intended to cover both conditions. It is directly dependent upon the length of exposure in an untreated air atmosphere, and the alloy composition, primarily the magnesium content. Although it can be determined readily for each set of conditions, it has been observed that these points fall within the range of 575 to 750° F., and generally 600 to 675° F.

Generally, the electron diffraction determination involves heating samples in air to various temperatures and under various conditions of humidity and time. After such treatment, the samples are exposed to an electron beam in diffraction apparatus wherein the beam is reflected from the surface of the samples and a pattern is made upon a film as in X-ray diffraction studies. By comparing the pattern with that of a known sample, the nature of the substances on the surface of the metal sample can be determined. This diffraction pattern provides a qualitative indication of the presence of magnesium oxide.

The term "aluminum-magnesium alloy" as herein employed refers to an aluminum base alloy containing 0.1 to 15 percent magnesium, with or without the presence of other elements, such as from 0.1 to 12 percent copper or 0.25 to 14 percent silicon or 0.1 to 20 percent zinc or 0.1 to 3 percent manganese, or combinations of two or more of these elements. Any of the foregoing alloys may also contain one or more of the following elements, often referred to as "hardeners," in the following percentages:

0.05 to 0.5 percent chromium
0.01 to 0.5 percent titanium
0.25 to 2.5 percent nickel 0.01 to 0.5 percent boron
0.002 to 2 percent beryllium
0.1 to 0.5 percent molybdenum
0.1 to 0.5 percent zirconium
0.1 to 0.5 percent tantalum
0.1 to 0.5 percent colombium
0.1 to 0.5 percent cobalt However, the total amount of the latter elements should not exceed about 3 percent.

The boron trifluoride-containing atmosphere may be provided by any one of several methods. Solid inorganic carrier compounds may be deposited in a conventional air atmosphere furnace which, when heated to a temperature b low the critical oxidation temperature of the alloy, will decompose or volatilize and yield boron trifluoride. As an alternative, the boron trifluoride vapor may be injected from a suitable source into the atmosphere which has been heated to the desired temperature. An atmosphere composed entirely of boron trifluoride may be employed but this is not generally practical since highly satisfactory results are obtained with the trifluoride vapor diluted with air, even to the point where the trifluoride constitutes only a few percent of the atmosphere. In still another method, the surface of the alloy component may be coated with an organic carrier compound, which when heated to the desired temperature range, will decompose or volatilize and yield boron trifluoride.

The term "carrier" as used herein refers to those compounds, both organic and inorganic, which contain boron trifluoride in chemically combined or sorbed form and which yield boron trifluoride in a reactive form when heated above 400° F. but below 750° F.

The carrier compounds should not yield the vapors below about 400° F. since the film, if any, developed below this temperature is considerably less effective, possibly due to a different crystalline structure in the protective surface. Nevertheless the carrier may decompose over a wide temperature range above 400° F. as is generally experienced in products of this type which contain impurities; however some decomposition may commence below 400° F., but the amount is small and should be disregarded. Examples of compounds found suitable as inorganic carriers are ammonium fluoroborate and calcium fluoroborate.

The organic carrier compounds are preferably selected from the organic ammonium fluoroborates which yield boron trifluoride in a reactive state between 400 and 750° F. These compounds may be described as the products of reaction between fluoroboric acid, $HBF_4$, and the constituent amine or amide. Examples of organic carrier compounds are the aliphatic ammonium fluoroborates di-n-butyl ammonium tetrafluoroborate, n-octadecyl-N,N,N, trimethyl ammonium tetrafluoroborate and di-n-amyl ammonium tetrafluoroborate.

The organic carrier compound is preferably applied to the surface of the aluminum-magnesium alloy component in a liquid vehicle, i.e. as a solution or dispersion in water or an organic medium, although it may be applied in a liquid state. It is only essential that the liquid vehicle evaporate below the decomposition point of the organic carrier compound and leave the fluoroborate deposited on the surface of the metal; however, generally it is inadvisable to use liquid boiling at relatively low temperatures, i.e. below about 50° C., especially if the vapors are flammable. The tendency of the higher molecular weight compounds, i.e. those containing above six carbon atoms, to carbonize and stain restricts use of these. The liquid vehicles preferred are water and methyl, ethyl, propyl, isopropyl, butyl and isobutyl alcohols, all of which evaporate rather readily and leave no carbonization products. The organic carrier compounds are found to dissolve in these solvents and storage of prepared solutions is relatively easy.

The above described steps and compounds may be used singly or in combination.

It is necessary that the aluminum-magnesium alloy component be exposed to an atmosphere of boron trifluoride immediately adjacent the metal surface. When employing the methods of direct gas injection or decomposition of inorganic boron trifluoride carrier compounds deposited within the furnace, such an atmosphere is one containing at least 0.075 gram of boron trifluoride per cubic foot of furnace atmosphere, and preferably above 0.27 gram boron trifluoride.

When the method of coating the alloy component with an organic carrier compound is utilized, an aqueous or alcoholic solution containing at least 0.2 percent, and preferably about 0.8 percent, by weight of boron trifluoride has been found to yield sufficient trifluoride in an air atmosphere to produce the desired protective film upon the surface of the article and yet to provide a surface substantially free from organic material upon decomposition of the carrier compound. Excessive amounts of the organic material should not be used in order to avoid carbonization and staining of the metal surface.

Generally, exposure to the boron trifluoride containing atmosphere for one minute to one hour is sufficient to establish the desired protective film, the length of time in any case being dependent upon the concentration of boron trifluoride in the atmosphere. However, when a boron trifluoride carrier is applied to the surface of the article, sufficient time should be allowed for decomposition of the compounds to occur and establish the desired atmosphere, as well as to permit substantially complete decomposition and vaporization of the carrier. Treatments less than one minute are not obeserved to permit development of a satisfactory protective film while treatments in excess of one hour do not provide any additional protection or offer any further benefit. Generally, periods from five to thirty minutes are sufficient; however, longer periods of treatment may be desirable in the case of alloys particularly susceptible to oxidation or when the surface oxide film has a thickness greater than that normally developed by exposure to the atmosphere.

The present process may be practiced in an untreated air atmosphere, i.e., a normal air atmosphere as commonly employed in heat-treating furnaces. No drying of the air need be undertaken as moisture can be tolerated; also, observations indicate that more satisfactory results are obtained when the furnace atmosphere contains at least ¼ grain of water per cubic foot of furnace volume, but it should not exceed about 45 grains per cubic foot. In addition the atmosphere may be contaminated with such substances as sulfur dioxide, hydrogen chloride, ammonia, carbon monoxide and carbon dioxide without adverse effect upon the action of the boron trifluoride.

Gases which are inert toward the aluminum-magnesium alloys may be employed in place of air, such as nitrogen, argon, helium and fuel gas. The term "atmosphere" as used herein includes both air and the inert gases.

Further, this invention is most effectively practiced when the alloy components have not previously been subjected to temperatures above their critical oxidation temperature. The presence of magnesium oxide on the surface, which has been produced in preceding thermal treatments, is observed to reduce the effectiveness of boron trifluoride, presumably due to the formation of oxy-fluoride complexes, but there is still substantial benefit to be derived from the treatment of this invention.

When the inorganic carrier compounds are utilized, it is desirable to spread out the substance in a thin layer in the furnace chamber so that a large surface area is exposed to heat and decomposition of the entire quantity may take place more readily.

A preferred embodiment of this invention for bonding two or more aluminum-magnesium alloy components contemplates the use of a solution containing an organic carrier compound. For example, the solution is applied to the surface of a scalped aluminum-magnesium alloy ingot which is to be bonded to another component. The ingot along may then be heated to a temperature above the decomposition point of the carrier compound but below the critical oxidation temperature of the alloy in order to develop the desired surface condition, or the solution coated ingot may be assembled with the cladding layer or layers and the whole assembly heated. Upon being heated the organic carrier compound decomposes and yields boron trifluoride.

Where an assembly is to be heated the most effective means of providing boron trifluoride at the interface is to employ an organic carrier compound since the alternate methods necessitate penetration of the surrounding atmosphere between the components and this may be slow and not wholly effective. Following the treatment with boron trifluoride the assembly is then heated to the preheating temperature preparatory to hot working, removed from the furnace and hot-pressed, as by rolling, to effect a bond between the components. Instead of hot rolling, the bonding may be accomplished by compressing the components in a press and permitting some lateral expansion of the components.

Illustrating the efficacy of the present invention are the following examples wherein components of aluminum-magnesium alloys were treated in accordance with the method described herein and effectively roll-bonded to other aluminous metal components. Previous attempts to directly roll-bond these aluminum-magnesium components to other aluminous metal components or other aluminum-magnesium alloy components by prior commercial practices without a bonding interlayer were unsuccessful, large surface areas remaining completely unbonded and numerous blisters occurring in partially bonded areas.

The production of composite articles wherein the core and cladding have the same or nearly the same composition constitutes an especially difficult problem because of the tendency for both surfaces at an interface to become heavily oxidized and in that both components have substantially the same hardness. The need for bonding components of the same alloy has developed from the demand for sheet having improved surface quality, such as is used for ornamental ware, which is not provided by a conventional sheet of that alloy. For example, the surface of the article may require a more thorough cold working than can be provided by usual rolling practice to minimize oil streaking and to effect a more uniform distribution of any undissolved constituents in the alloy which would otherwise cause undesirable surface defects, especially when the sheet is subjected to a subsequent decorative coating process.

Example 1.—A composite sheet was made by bonding cladding slabs to an ingot core of an alloy, each nominally composed of aluminum and 0.8 percent magnesium. Both the slabs and ingot were swabbed on the surfaces to be bonded with a solution containing 2.5 percent by weight of n-di-butyl ammonium tetrafluoroborate in isopropyl alcohol. The scalped core ingot 120 inches long, 48 inches wide and 14 inches thick, was assembled with a slab 120 inches long, 48 inches wide and 2 inches thick, on one face of the ingot. The assembly was placed in a preseating furnace, and heated at such a rate that it was held within the temperature range of 400 to 575° F. for about ½ hour. After this preliminary treatment the assembly was heated to and soaked at 1000° F. within a period of 18 hours to prepare it for hot rolling. At the end of this time the assembly was removed from the furnace, hot rolled at 900° F. to strip 0.150 inch thickness and coiled. The coil was annealed by soaking at 650° F. for 2 hours. Upon inspection, both before and after annealing, the composite sheet was found to be completely bonded and there was no blistering. Had the bonding been incomplete, any gas at the non-bonded areas would have produced blisters. The presence of blisters after annealing is considered to be a critical test of uniformity of the bond.

Example 2.—A composite sheet was made in the same manner from an ingot and cladding slab of the same size each nominally composed of aluminum, 1.0 percent magnesium and 0.3 percent manganese. Both ingot and slab were swabbed with a solution containing 2.5 percent by weight of n-di-butyl ammonium tetrafluoroborate in isopropyl alcohol. As described in Example 1, the assembly was given the same preliminary thermal treatment at 400 to 575° F. and subsequently preheated for hot rolling. The assembly was hot-rolled at about 900° F. to strip 0.150 inch in thickness, coiled and annealed at 650° F. for 2 hours. No blisters or other evidence of imperfect bonding were found upon examination of the annealed strip.

Example 3.—A composite sheet was produced from an ingot nominally composed of aluminum, 2.75 percent magnesium, 0.8 percent manganese and 0.1 percent chromium, and a slab nominally composed of aluminum, 2.75 percent magnesium, and 1.0 percent zinc, the ingot and slab being of the size mentioned in Example 1. The surfaces of the ingot and slab were swabbed with the solution referred to in the preceding examples. The ingot and cladding slab were assembled and placed in the preheating furnace, initially heated and held within the temperature range of 400 to 575° F. for about ½ hour, and then heated to and soaked at a temperature of 1000° F. for 14 hours. The assembly was removed from the furnace and hot-rolled at about 920° F. to strip 0.140 inch in thickness, coiled and annealed at 650° F. for 2 hours. No evidence of blistering or other bond defects were found upon examination of the annealed strip.

Example 4.—A further example of the effectiveness of the preliminary treatment of the present invention is that found in the hot rolling of a pack of sheets of an alloy nominally composed of aluminum, 5.2 percent magnesium, 0.10 percent manganese, 0.10 percent chromium, and 0.003 percent beryllium. The 2 inch by 6 inch sheets, 0.064 inch in thickness, were assembled in packs of six sheets and placed in a circulating air preheating furnace to which a sufficient amount of ammonium fluoroborate had been added to yield 20 grams $BF_3$ per cubic foot of furnace atmosphere. The packs were heated to 550° F. and held at their temperature for 15 minutes after which the temperature was raised to 875° F. and the packs soaked at that temperature for ½ hour. The packs of sheet were removed from the furnace, hot rolled at a temperature of 875° F. to form a composite sheet having a thickness of 0.032 inch, coiled, and annealed at 600° F. for ½ hour. Upon visual inspection and metallographic examination, all six pieces were found to be completely bonded together and there was no blistering of the composite product.

Having thus described my invention, I claim:

1. In the bonding of composite aluminous metal articles wherein at least one component is an aluminum base alloy containing 0.1 to 15 percent magnesium, the method comprising providing an atmosphere in a furnace containing not less than 75 milligrams of boron trifluoride per cubic foot of atmosphere, placing said component in said furnace, heating said component to a temperature between 400° F. and 750° F., but below the critical oxidation temperature of said alloy component for a long enough time to develop an oxidation-resistant film on the surface thereof, thereafter preheating the components of said composite article at a temperature above said critical oxidation temperature, and finally pressure-bonding said components while still hot to form the composite metal article.

2. The method in accordance with claim 1 wherein the atmosphere into which the boron trifluoride is introduced consists of air.

3. The method in accordance with claim 1 wherein the atmosphere into which the boron trifluoride is introduced consists of air containing at least ¼ but not more than 45 grains of water per cubic foot.

4. The method in accordance with claim 1 wherein the component is exposed to the atmosphere containing boron trifluoride at a temperature between 400 and 575° F. for 1 minute to 1 hour.

5. The method in accordance with claim 1 wherein the components are pressure-bonded by hot-rolling.

6. In the bonding of composite aluminous metal articles wherein at least one component is an aluminum base alloy containing 0.1 to 15 percent magnesium, the method comprising providing an atmosphere in a furnace substantially inert toward the alloy component, placing said component in said furnace, heating said component to a temperature between 400° F. and 750° F., but below the critical oxidation temperature of said alloy, introducing boron trifluoride vapor into said atmosphere in an amount of not less than 75 milligrams per cubic foot of atmosphere, maintaining said alloy component within the said temperature range for a period of one to sixty minutes to develop an oxidation-resistant film on the surface thereof, thereafter preheating the components of said composite article to a temperature above said critical oxidation temperature, and finally pressure-bonding said components while still not to form the composite metal article.

7. In the bonding of composite aluminous metal articles wherein at least one component is an aluminum base alloy containing 0.1 to 15 percent magnesium, the method comprising providing an atmosphere in a furnace substantially inert toward the alloy component and exposing to the atmosphere a solid inorganic boron trifluoride-carrier compound which yields boron trifluoride at a temperature between 400° F. and 750° F., sufficient compound being supplied to provide at least 75 milligrams of boron trifluoride per cubic foot of atmosphere, introducing said component into said atmosphere in contact with boron trifluoride-carrier compound, heating said furnace atmosphere and component to a temperature of at least 400° F. but below 750° F. and not higher than the critical oxidation temperature of said alloy component for a period of one to sixty minutes at which temperature the said inorganic compound yields boron trifluoride vaporizes, thereafter preheating the components of said composite article to a temperature above said critical oxidation temperature of said alloy component, and finally pressure-bonding said components while still hot to form the composite metal article.

8. In the bonding of composite aluminous metal articles wherein at least one component is an aluminum base alloy containing 0.1 to 15 percent magnesium, the method comprising providing an atmosphere in a furnace substantially inert toward said alloy component, coating said component with an organic ammonium fluoroborate which yields boron trifluoride when heated to a temperature above 400° F. but below 750° F., heating said coated component in said furnace atmosphere to a temperature between 400° F. and 750° F., but in all cases below the critical oxidation temperature of said alloy component, for a period of time sufficiently long to cause substantial disappearance of the organic substance whereby a protective film is developed on the surface of said alloy component, thereafter preheating the components of said composite article to a temperature above said critical oxidation temperature of said alloy component, and finally pressure bonding said components while still hot to form the composite metal article.

9. The method in accordance with claim 8 wherein the organic compound is an aliphatic ammonium fluoroborate.

10. The method in accordance with claim 8 wherein said oragnic ammonium fluoroborate yields boron trifluoride at a temperature above 400° F. but below 575° F.

11. In the bonding of composite aluminous metal articles wherein two or more components are of an aluminum base alloy containing 0.1 to 15 percent magnesium, the method comprising providing an atmosphere in a furnace containing not less than 75 milligrams of boron trifluoride per cubic foot of atmosphere, placing said components in said furnace, heating said components to a temperature between 400° F. and 750° F., but below the critical oxidation temperature of said alloy components for a long enough time to develop an oxidation-resistant film on the surface thereof, thereafter preheating the components of said composite article at a temperature above said critical oxidation temperature, and finally pressure-bonding said components while still hot to form the composite metal article.

12. The method in accordance with claim 8 wherein the atmosphere surrounding the components being heated consists of air.

13. The method in accordance with claim 8 wherein the atmosphere surrounding the components being heated consists of air containing at least ¼ but not more than 45 grains of water per cubic foot.

14. In the bonding of composite aluminous metal articles wherein at least one component consists of an aluminum base alloy containing from 0.1 to 15% magnesium, the method comprising initially heating said component in contact with boron trifluoride to a temperature between 400 and 750° F., but below the critical oxidation temperature of the alloy component, for a sufficient length of time to develop an oxidation resistant film on the surface thereof, thereafter preheating the components to a higher temperature above critical oxidation temperature of said alloy component and finally pressure bonding said components while still hot to form the composite metal article.

References Cited in the file of this patent

UNITED STATES PATENTS

| | | |
|---|---|---|
| 2,100,411 | Reuleaux | Nov. 30, 1937 |
| 2,561,566 | Edson | July 24, 1951 |
| 2,674,790 | Edson | Apr. 13, 1954 |
| 2,821,014 | Miller | Jan. 28, 1958 |

OTHER REFERENCES

Metals Handbook, 1948 Edition, p. 807, published by American Society for Metals.

UNITED STATES PATENT OFFICE
CERTIFICATION OF CORRECTION

Patent No. 2,969,590                      January 31, 1961

Spencer R. Milliken

It is hereby certified that error appears in the above numbered patent requiring correction and that the said Letters Patent should read as corrected below.

Column 1, line 30, for "sypes" read -- types --; column 2, line 31, for "775° F." read -- 575° F. --; column 3, line 14, for "b low" read -- below --; column 5, line 50, for "oil" read -- roll --; line 65, for "preseating" read -- preheating --; column 6, line 45, for "per-" read -- per ---; line 52, for "an" read -- an- --.

Signed and sealed this 13th day of June 1961.

(SEAL)
Attest:

ERNEST W. SWIDER                          DAVID L. LADD
Attesting Officer                          Commissioner of Patents